US012775642B2

(12) United States Patent
Bryant et al.

(10) Patent No.: US 12,775,642 B2
(45) Date of Patent: Oct. 27, 2026

(54) SYSTEMS AND METHODS FOR DYNAMICALLY GENERATING DATA SECURITY MODELS AND VISUALIZATIONS OF DATA SECURITY VULNERABILITIES USING GENERATIVE ARTIFICIAL INTELLIGENCE

(71) Applicant: BANK OF AMERICA CORPORATION, Charlotte, NC (US)

(72) Inventors: Matthew K. Bryant, Mount Holly, NC (US); Natalie Meta Sterling, Fort Mill, SC (US); Luis Pina, Charlotte, NC (US); Patricia A. Albritton, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 100 days.

(21) Appl. No.: 18/767,384

(22) Filed: Jul. 9, 2024

(65) Prior Publication Data

US 2026/0017288 A1 Jan. 15, 2026

(51) Int. Cl.

*G06F 16/00* (2019.01)
*G06F 16/29* (2019.01)
*H04L 9/40* (2022.01)

(52) U.S. Cl.

CPC .......... *G06F 16/29* (2019.01); *H04L 63/1433* (2013.01)

(58) Field of Classification Search

CPC ............................ G06F 16/29; H04L 63/1433
See application file for complete search history.

(56) References Cited

U.S. PATENT DOCUMENTS

| | | | |
|---|---|---|---|
| 5,243,652 | A | 9/1993 | Teare |
| 5,694,590 | A | 12/1997 | Thuraisingham |
| 5,778,304 | A | 7/1998 | Grube |
| 5,892,908 | A | 4/1999 | Hughes |
| 5,922,073 | A | 7/1999 | Shimada |
| 5,933,498 | A | 8/1999 | Schneck |
| 6,023,278 | A | 2/2000 | Margolin |
| 6,085,090 | A | 7/2000 | Yee |
| 6,108,365 | A | 8/2000 | Rubin |
| 6,151,631 | A | 11/2000 | Ansell |
| 6,154,172 | A | 11/2000 | Piccionelli |
| 9,311,499 | B2 | 4/2016 | Redlich |
| 11,556,671 | B2 | 1/2023 | Lockhart, III |

(Continued)

*Primary Examiner* — Dinku W Gebresenbet
(74) *Attorney, Agent, or Firm* — Moore & Van Allen PLLC; Lauren M. Stokes

(57) ABSTRACT

Systems, computer program products, and methods are described herein for dynamically generating data security models and visualizations of data security vulnerabilities using generative artificial intelligence. The present invention is configured to collect historical data associated with at least one data transmission; determine at least one geographic location identifier for the at least one data transmission; determine a user identifier for the at least one data transmission; generate, by a generative artificial intelligence (AI) engine, a record snapshot of the at least one data transmission and the at least one geographic location identifier, wherein the record snapshot comprises at least one context dataset generated by the generative AI engine; and generate, by the generative AI engine, a geographic map comprising at least one data point for the historical data and the at least one geographic location identifier.

20 Claims, 10 Drawing Sheets

(56) References Cited

U.S. PATENT DOCUMENTS

| | | | | |
|---|---|---|---|---|
| 2002/0016831 | A1 | 2/2002 | Peled | |
| 2002/0143991 | A1 | 10/2002 | Chow | |
| 2003/0009594 | A1 | 1/2003 | McElligott | |
| 2003/0172036 | A1 | 9/2003 | Feigenbaum | |
| 2006/0064374 | A1 | 3/2006 | Helsper | |
| 2022/0156340 | A1* | 5/2022 | Li | G06F 16/90332 |
| 2022/0224706 | A1 | 7/2022 | Peng | |
| 2022/0224723 | A1 | 7/2022 | Crabtree | |
| 2022/0366354 | A1* | 11/2022 | Maiman | G06Q 10/083 |
| 2024/0303475 | A1* | 9/2024 | Yang | G06N 3/0985 |
| 2025/0165754 | A1* | 5/2025 | Williamson | G06V 20/13 |

* cited by examiner

SYSTEMS AND METHODS FOR DYNAMICALLY GENERATING DATA SECURITY MODELS AND VISUALIZATIONS OF DATA SECURITY VULNERABILITIES USING GENERATIVE ARTIFICIAL INTELLIGENCE

FIELD OF THE INVENTION

The present invention embraces a system for dynamically generating data security models and visualizations of data security vulnerabilities using generative artificial intelligence (AI).

BACKGROUND

In large network environments today, especially where many data transmissions (especially data that needs to remain secure) are remotely transmitted between user devices and user accounts, it is increasingly difficult to make sure that the recipient or sender of these data transmissions are not threats to the data security or to the user devices themselves. Additionally, and where a large number of these data transmissions occur every day, it is increasingly difficult to perform analyses on each of the data transmissions in real time or near real time to prevent data misappropriation before it can occur. Thus, there exists a need for a system that can efficiently, securely, and dynamically generate data security models and visualizations of data security vulnerabilities using generative AI.

Applicant has identified a number of deficiencies and problems associated with determining data security vulnerabilities and patterns from vast amounts of data across different networks and across different geographic locations. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for dynamically generating data security models and visualizations of data security vulnerabilities using generative artificial intelligence is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: collect historical data associated with at least one data transmission; determine at least one geographic location identifier for the at least one data transmission; determine a user identifier for the at least one data transmission; generate, by a generative artificial intelligence (AI) engine, a record snapshot of the at least one data transmission and the at least one geographic location identifier, wherein the record snapshot comprises at least one context dataset generated by the generative AI engine; and generate, by the generative AI engine, a geographic map comprising at least one data point for the historical data and the at least one geographic location identifier.

In some embodiments, executing the computer-readable code is further configured to cause the at least one processing device to: transmit the geographic map to a user device, wherein the geographic map comprises a configuration trigger for a graphical user interface (GUI); and automatically configure, at a user device, the GUI of the user device with the geographic map. In some embodiments, the geographic map is interactive on the GUI of the user device.

In some embodiments, executing the computer-readable code is further configured to cause the at least one processing device to: transmit the record snapshot to a user device, wherein the record snapshot comprises a configuration trigger for a graphical user interface (GUI); and automatically configure, at a user device, the GUI of the user device with the record snapshot.

In some embodiments, executing the computer-readable code is further configured to cause the at least one processing device to: transmit the record snapshot and the geographic map to a user device; and automatically configure, at the user device, a configuration of a graphical user interface (GUI) of the user device with the geographic map and the record snapshot, wherein the record snapshot updates as the user device receives an input for the geographic map.

In some embodiments, the generative AI engine generates the at least one context dataset by contextualizing a significance of a plurality of vectors, wherein the plurality of vectors is based on the historical data.

In some embodiments, the record snapshot comprises a plurality of geographic location identifiers and geographic vectors between geographic location identifiers associated with a user identifier and a plurality of historical resource transmissions.

In some embodiments, executing the computer-readable code is further configured to cause the at least one processing device to: identify a user input from a user device; determine, by the generative AI engine, at least one potential consequence of the user input in real time, wherein the potential consequence is generated based on a dataset of consequential historical data associated with a plurality of user identifiers; generate an alert interface component comprising the at least one potential consequence; transmit the alert interface component to the user device; and trigger a configuration of a graphical user interface (GUI) of the user device.

In some embodiments, executing the computer-readable code is further configured to cause the at least one processing device to: collect a geographic historical dataset comprising a plurality of historical geographic identifiers associated with a plurality of historical resource transmission; generate a first training dataset comprising the geographic historical dataset; apply the first training dataset to the generative AI engine; collect a plurality of historical user inputs, wherein the plurality of historical user inputs comprises a plurality of consequential historical user inputs; generate a second training dataset comprising the plurality of historical user inputs; and apply the second training dataset to the generative AI engine.

Similarly, and as a person of skill in the art will understand, each of the features, functions, and advantages provided herein with respect to the system disclosed herein-above may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
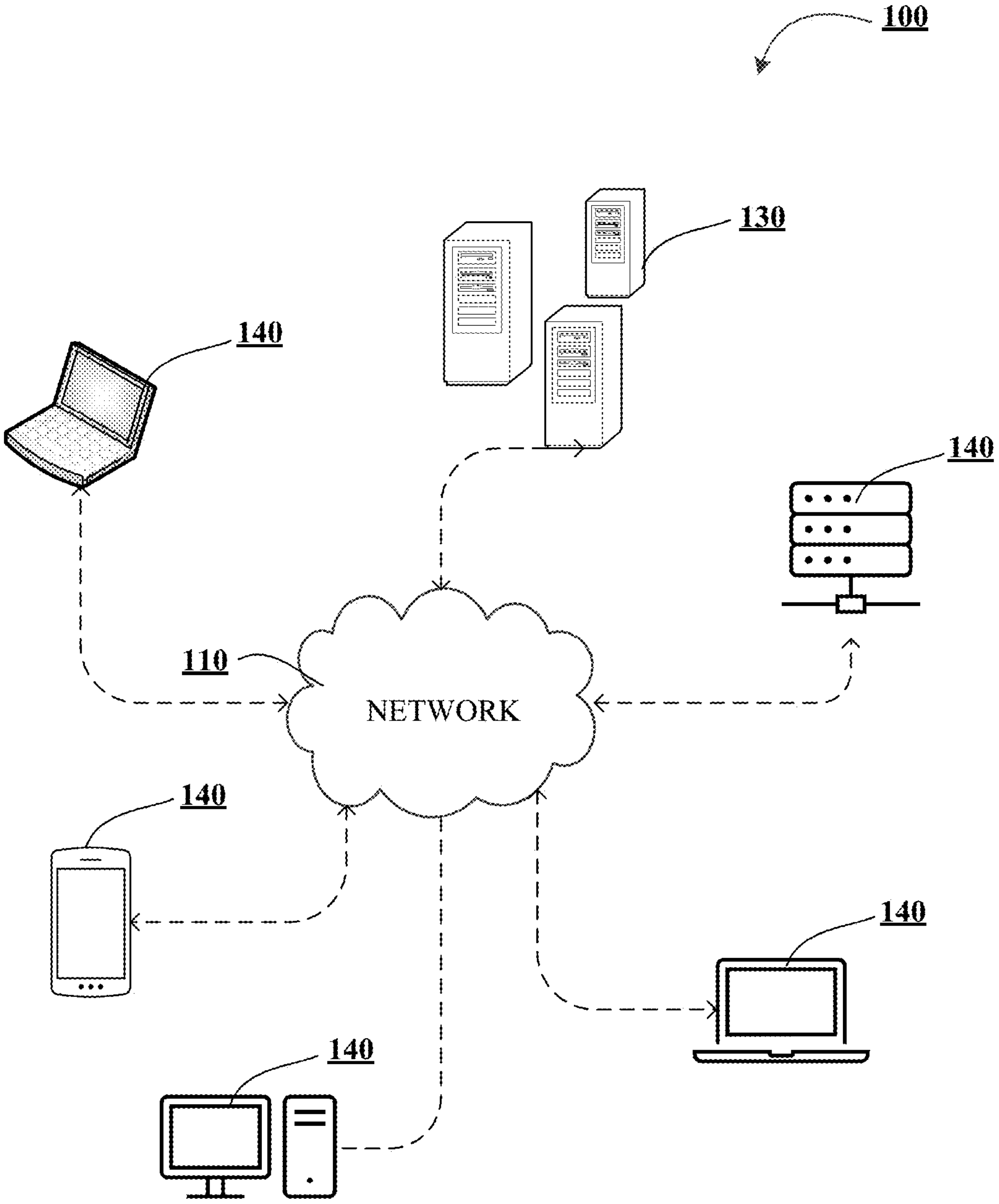
Figure 1B:
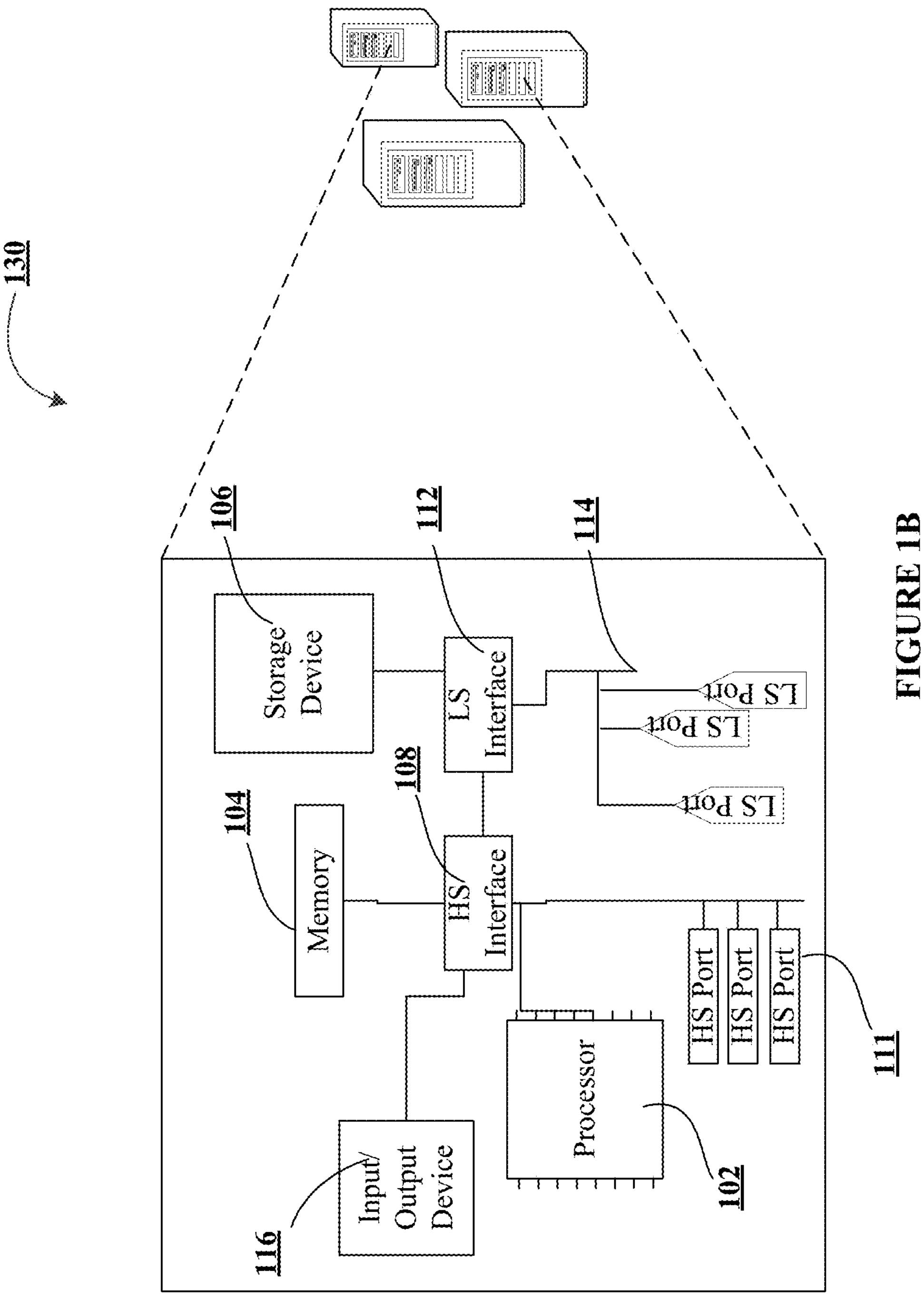
Figure 1C:
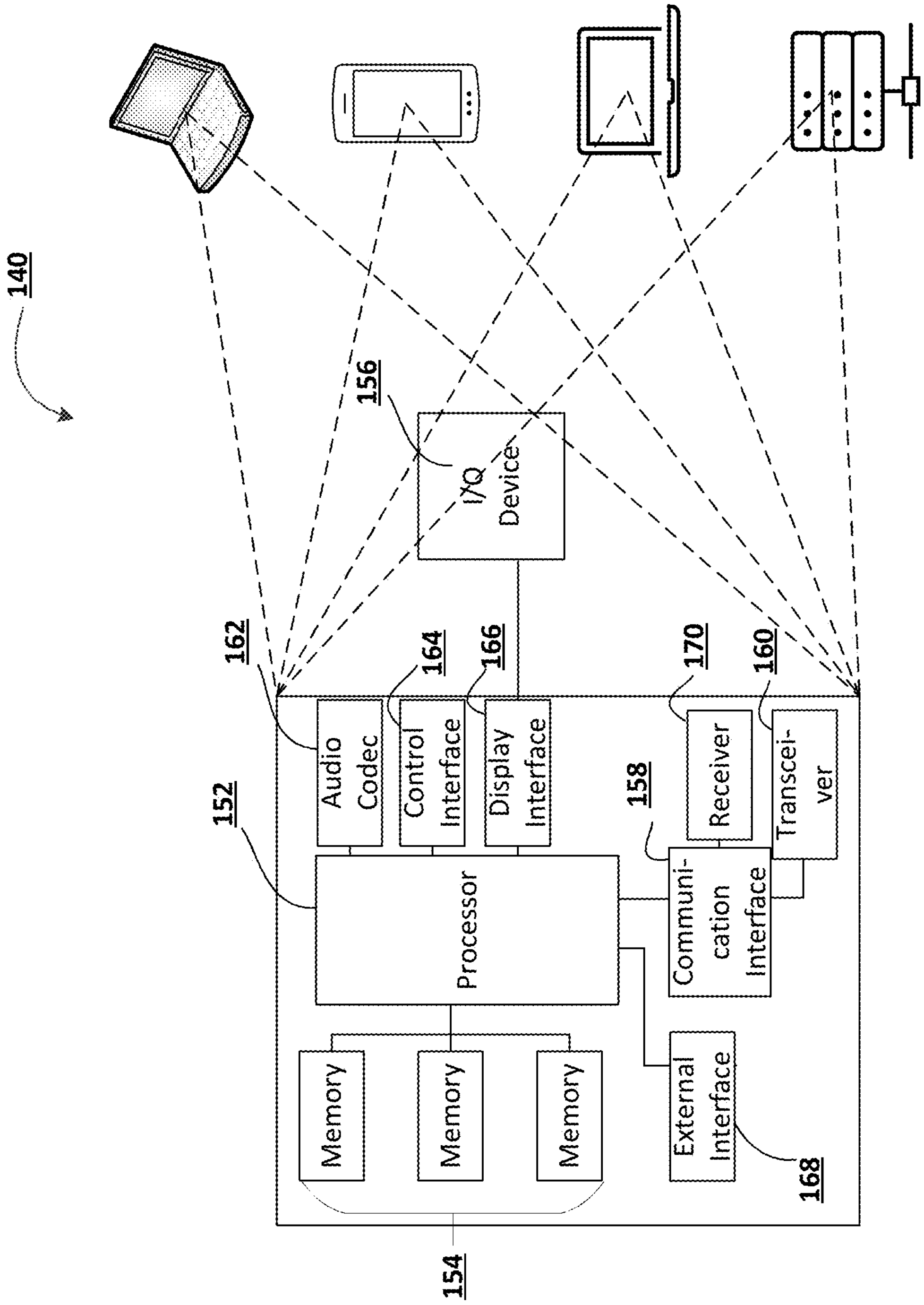
Figure 2:
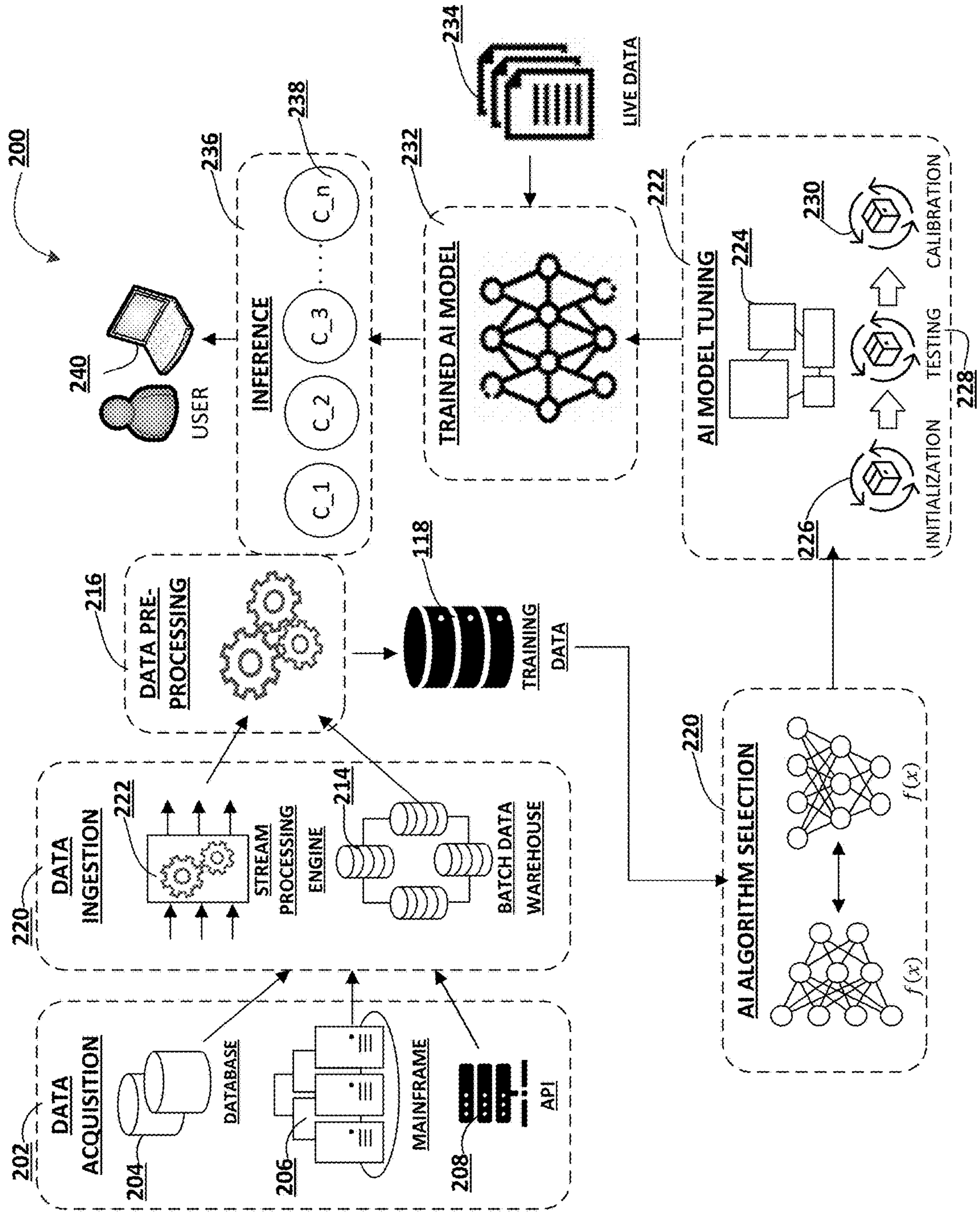
Figure 3:
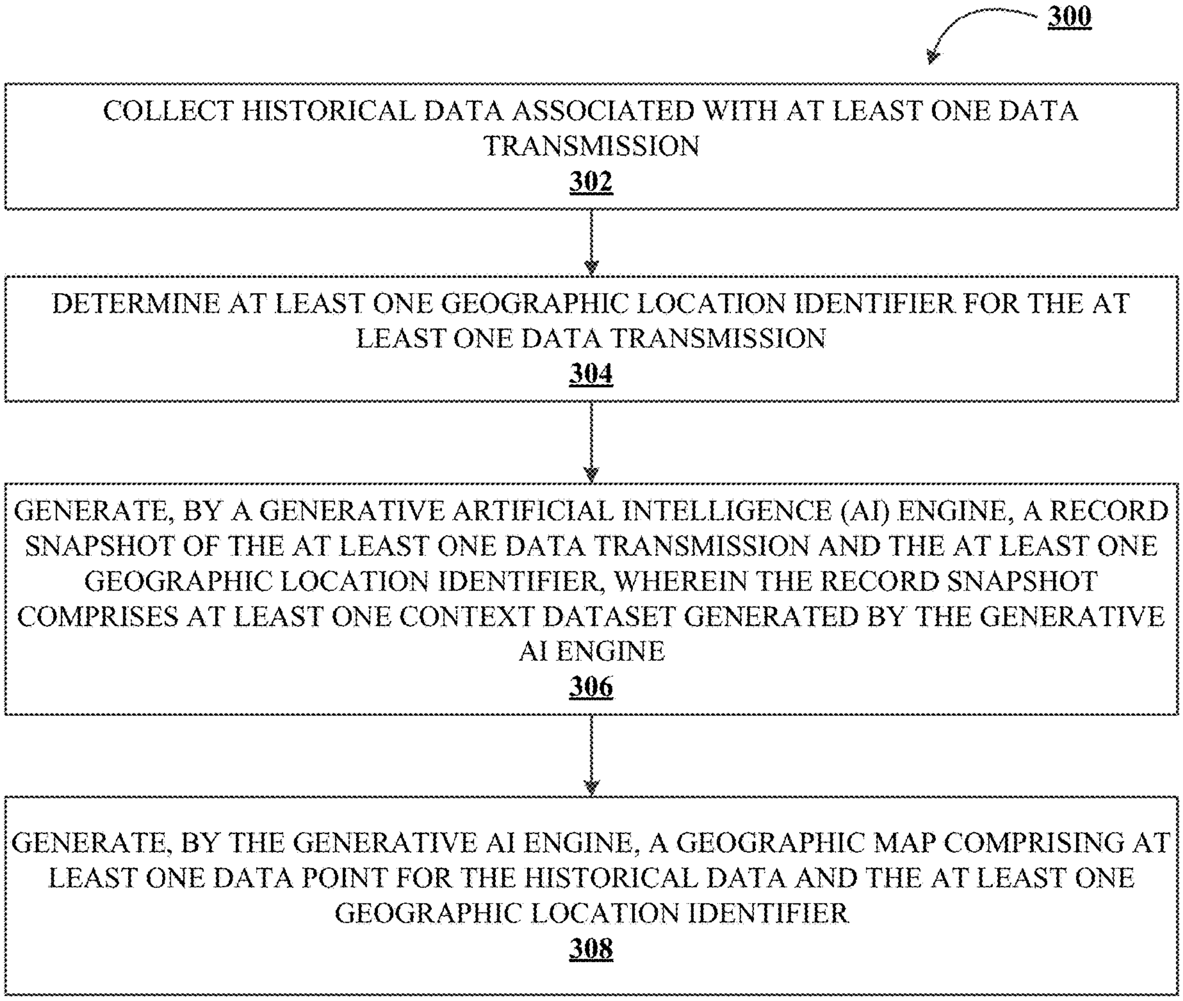
Figure 4:
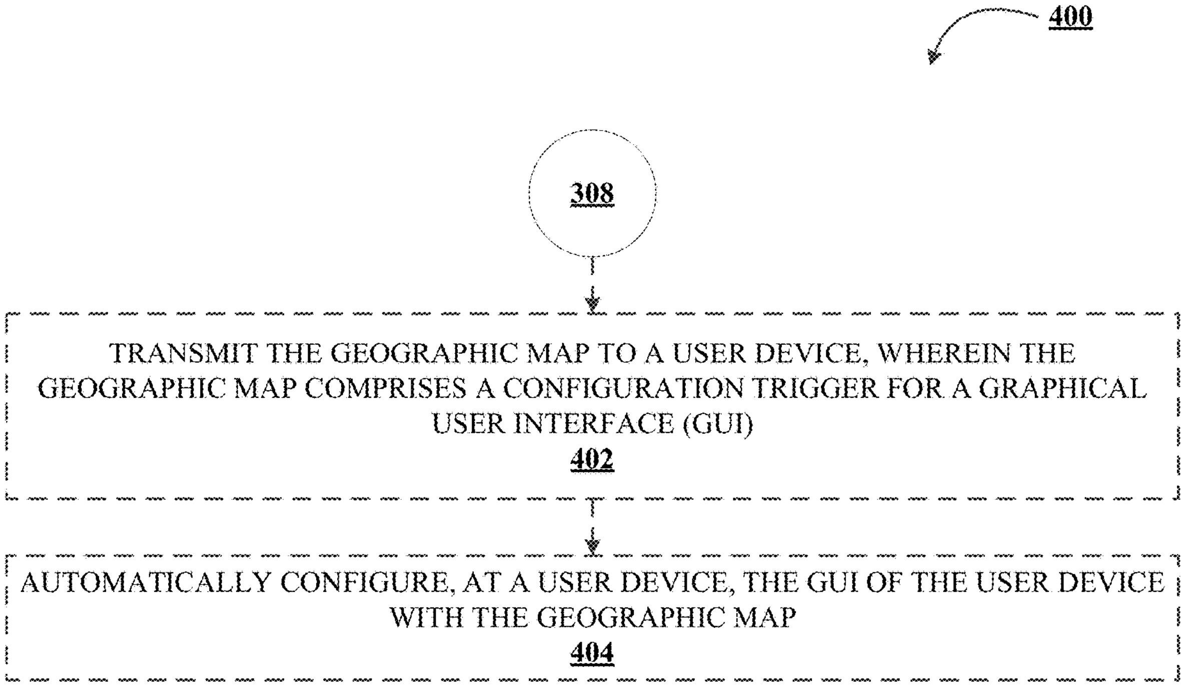
Figure 5:
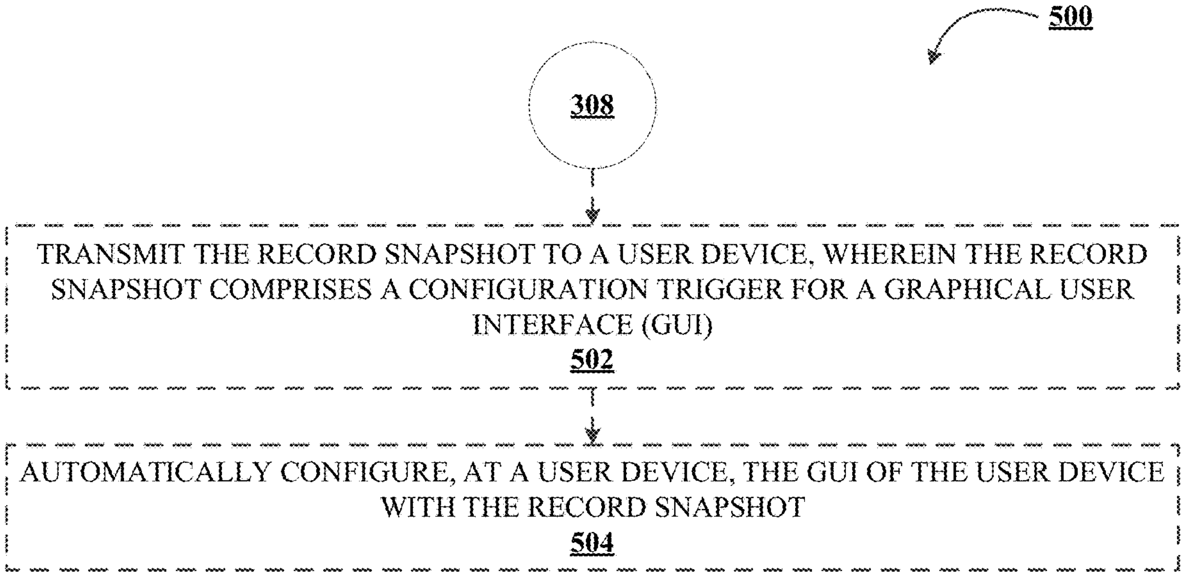
Figure 6:
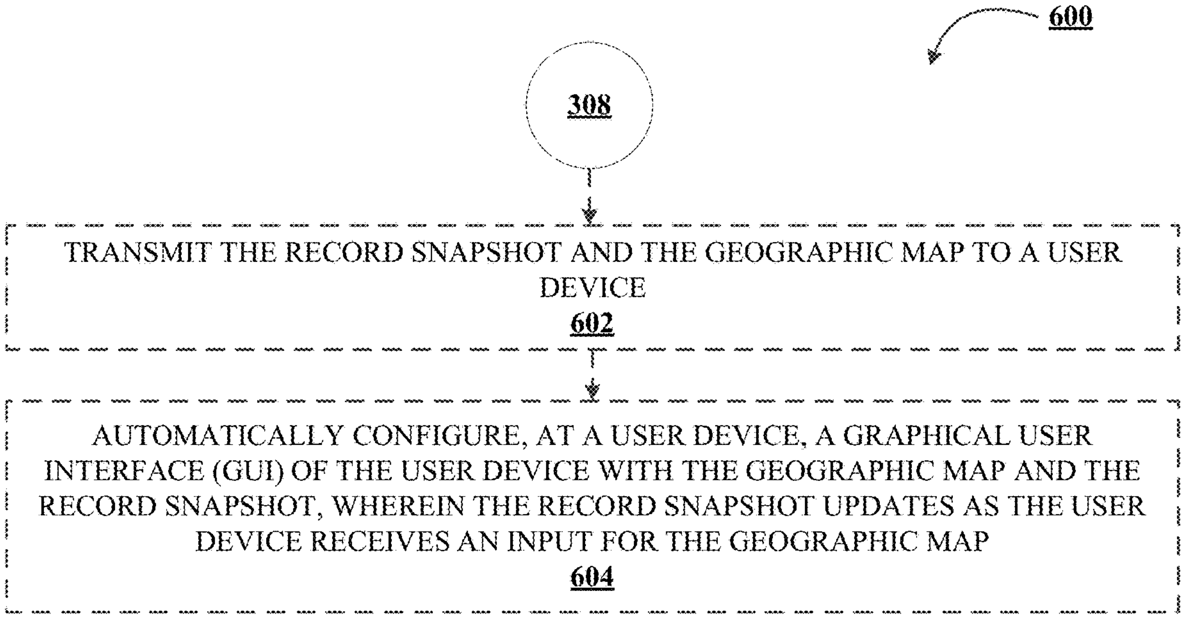
Figure 7:
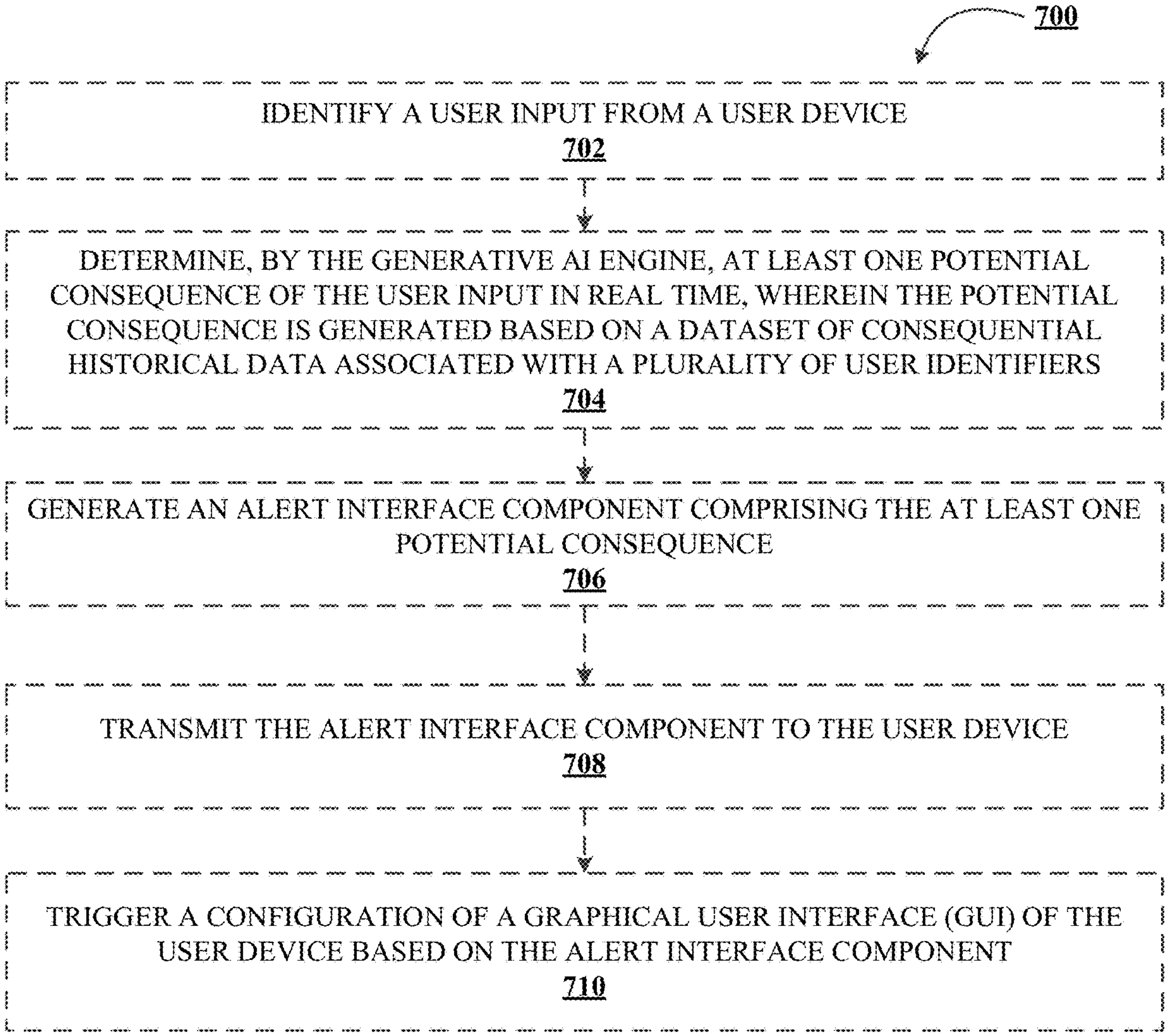
Figure 8:
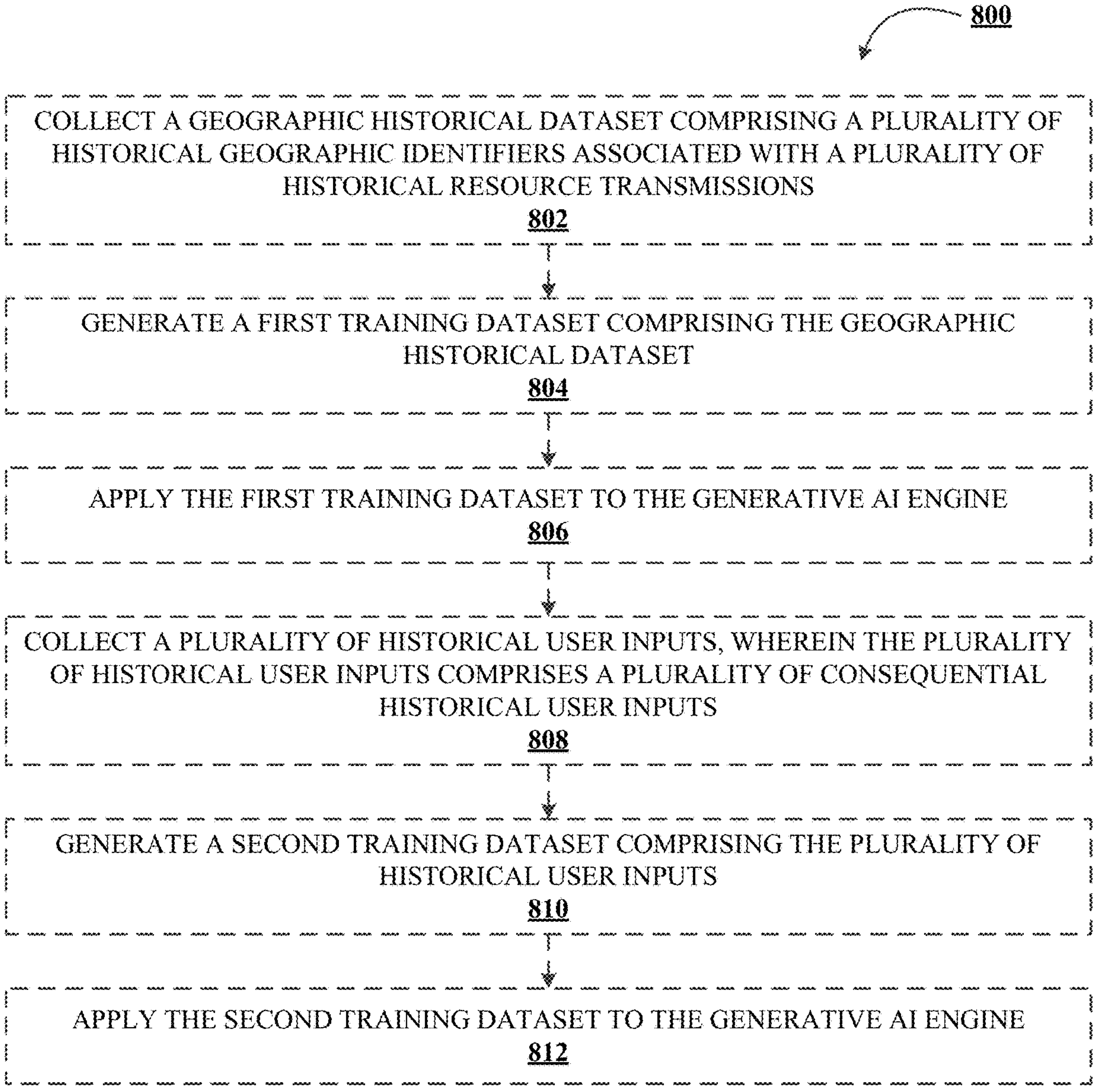

Having thus described embodiments of the invention in general terms, reference will now be made the accompanying drawings, wherein:

FIGS. 1A-1C illustrates technical components of an exemplary distributed computing environment for dynamically generating data security models and visualizations of data security vulnerabilities using generative artificial intelligence (AI), in accordance with an embodiment of the disclosure;

FIG. 2 illustrates an exemplary generative artificial intelligence (AI) engine subsystem architecture, in accordance with an embodiment of the disclosure;

FIG. 3 illustrates a process flow for dynamically generating data security models and visualizations of data security vulnerabilities using generative AI, in accordance with an embodiment of the disclosure;

FIG. 4 illustrates a process flow for automatically configuring a user device's graphical user interface with the geographic map, in accordance with an embodiment of the disclosure;

FIG. 5 illustrates a process flow for automatically configuring a user device's graphical user interface with the record snapshot, in accordance with an embodiment of the disclosure;

FIG. 6 illustrates a process flow for automatically configuring a user device's graphical user interface with the record snapshot and the geographic map, in accordance with an embodiment of the disclosure;

FIG. 7 illustrates a process flow for generating an alert interface component and triggering a configuration of a user device's graphical user interface with the alert interface component, in accordance with an embodiment of the disclosure; and FIG. 8 illustrates a process flow for training the generative AI engine, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a pre determined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

In large network environments today, especially where many data transmissions (especially data that needs to remain secure) are remotely transmitted between user devices and user accounts, it is increasingly difficult to make sure that the recipient or sender of these data transmissions are not threats to the data security or to the user devices themselves. Additionally, and where a large number of these data transmissions occur every day, it is increasingly difficult to perform analyses on each of the data transmissions in real time or near real time to prevent data misappropriation before it can occur.

For instance, in the dynamic landscape of cybersecurity within large network environments, data security teams and data security applications face challenges and difficulties in make real time determinations of data security vulnerabilities and threats. Such determinations of data security vulnerabilities and threats can be further difficult to determine when the underlying intent of the threat actors need to also be considered, but the only way to do this is to look at the historical data as a whole for a user, which can be too much data for a human to handle and make determinations in real time. Further, existing systems and technology lack the capability to forecast future activities of these bad actors and users, struggle with visualizing the global impact of threats, and fail to provide contextual narrative insights that could enhance decision-making and security measures. Thus, there exists a need for a system that can efficiently, securely, and dynamically generate data security models and visualizations of data security vulnerabilities using generative AI.

Accordingly, the present disclosure provides the collection of historical data associated with at least one data transmission; the determination of at least one geographic location identifier for the at least one data transmission; the determination of a user identifier for the at least one data transmission; and the generation, by a generative artificial intelligence (AI) engine, of a record snapshot of the at least one data transmission and the at least one geographic location identifier, wherein the record snapshot comprises at least one context dataset generated by the generative AI engine. Further, the disclosure provides for the generation, by the generative AI engine, a geographic map comprising at least one data point for the historical data and the at least one geographic location identifier.

In other words, a generative AI engine is trained to simulate the thought processes and strategies of various threat actors, allowing it to predict future actions based on past behaviors and emerging patterns, which helps cybersecurity teams anticipate and prepare for potential threats before they materialize. The system contextualizes the significance of different threat vectors by analyzing current events and historical data, providing timely alerts that are prioritized based on the assessed threats and relevance to the institution's operations. Utilizing geospatial data, the AI generates a comprehensive global map that displays the locations and movements of identified threat actors, aiding in pinpointing critical areas of concern and tracking the origin of significant threats, thereby enhancing the system's or client of the system's ability to deploy targeted security measures. Alongside real-time data visualization, the system crafts narrative reports that contextualize the threat data, explaining the potential impact of each threat in a straightforward manner to make complex data easily understandable for decision-makers. The system also illustrates potential vulnerabilities such as the consequences of weak passwords through impactful visuals, emphasizing the importance of robust security practices to all users within the organization. Additionally, the generative AI engine integrates transactional anomalies to detect unusual patterns that may indicate malicious activities like resource misappropriation, adjusting its monitoring based on the narrative and global context to reduce false positives such as freezing institution cards during legitimate cross-state travel. This disclosure not only enhances the capability of institutions to monitor and react to security threats but also integrates advanced visualization and narrative techniques to make the threat intelligence more actionable and accessible to security personnel.

Thus, and importantly, the disclosure provides a sophisticated Generative AI (Gen AI) engine designed to enhance cybersecurity by simulating threat actors' potential actions and providing detailed, contextual forecasts. The system leverages advanced AI algorithms to think like a threat actor, integrating various data points to predict and visualize potential security breaches. By creating a dynamic narrative and visual maps that illustrate the global distribution and severity of threats, the solution enables institutions to proactively address and mitigate cybersecurity threats more effectively.

What is more, the present invention provides a technical solution to a technical problem. As described herein, the technical problem includes determining data security vulnerabilities and patterns from vast amounts of data across different networks and across different geographic locations. The technical solution presented herein allows for the use of generative AI to generate record snapshots and geographic maps to give a whole picture of the potential threats to data security in real time or near real time. In particular, the disclosure is an improvement over existing solutions to the prediction and determination of data security threats, (i) with fewer steps to achieve the solution, thus reducing the amount of computing resources, such as processing resources, storage resources, network resources, and/or the like, that are being used (e.g., by showcasing the geographic map and/or the record snapshot on a user device, the data shown generated and shown on the user device may be limited to streamline decision-making to prevent data security and resource transmission misappropriation); (ii) providing a more accurate solution to problem, thus reducing the number of resources required to remedy any errors made due to a less accurate solution (e.g., by using a trained generative AI engine which is trained initially and continuously, the generative AI engine may make more accurate and real time decisions); (iii) removing manual input and waste from the implementation of the solution, thus improving speed and efficiency of the process and conserving computing resources (e.g., by automatically collecting and generating training datasets for the generative AI engine); (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for dynamically generating data security models and visualizations of data security vulnerabilities using generative AI 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides E shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary generative artificial intelligence (AI) engine subsystem architecture 200, in accordance with an embodiment of the disclosure. The artificial intelligence subsystem 200 may include a data acquisition engine 202, data ingestion engine 210, data pre-processing engine 216, AI engine tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so a artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow 300 for dynamically generating data security models and visualizations of data security vulnerabilities using generative AI, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300. In some embodiments, a generative artificial intelligence engine (e.g., such as the generative AI engine shown in FIG. 2) may perform some or all of the steps described in process flow 300.

As shown in block 302, the process flow 300 may include the step of collecting historical data associated with at least one data transmission. For example, historical data may refer to past or previous data associated with past or previous data transmissions or data transmission requests (e.g., resource transmission or resource transfers and their associated requests). In some embodiments, such historical data may comprise at least one user identifier that may have generated the data transmission request, received the data transmission, and/or the like. In some embodiments, the historical data may comprise geographic location identifiers for the geographic location where the data transmission request was generated, transmitted from, and/or where the data transmission was received.

Additionally, and in some embodiments, the historical data collected may be associated with at least one data transmission, whereby the at least one data transmission may comprise a current data transmission and/or a current data transmission request (such as a data transmission that has recently been received and/or a data transmission request that has recently been generated and/or submitted, respectively). In some embodiments, and based on an identification of a user account identifier for the at least one data transmission and/or based on a geographic location identifier for the at least one data transmission, the system may collect applicable historical data associated with the same user account identifier and/or associated with the same geographic location identifier. For example, and where a user inputs authentication credentials at a user device, and the user device is then used to generate a data transmission request, submit the data transmission request, and/or receive the data transmission, a user account identifier may be identified based on the user device identifier (such as a serial number, EID number, and/or the like) and/or based on the authentication credentials received. Thus, and in such an example, the system may use the user account identifier to collect historical data of past or previous data transmission requests and/or data transmissions for the same user account identifier. Additionally, and in some embodiments, the system may collect two datasets of historical data for two user account identifiers (e.g., the user account identifier associated with generating/sending the data transmission and the user account identifier associated with receiving the data transmission).

Additionally, and/or alternatively, the system may additionally collect the geographic location identifier for the geolocation of the user device at the time the data transmission request is generated, the data transmission request is submitted, and/or the data transmission is received. Thus, and in some embodiments, the system may collect historical data of past or data transmission requests and/or data transmissions from or to the same geographic location identifier. Thus, and in some embodiments, the system may collect two datasets for the historical data based on two different geographic location identifiers (e.g., the generation and/or location of transmission and the location of the data transmission is received).

In some embodiments, the system may identify this historical data from a database of historical data transmissions, an entity's database (such as a financial institution's database), a data center, and/or the like. In some embodiments, the system may collect historical data based on receiving the historical data over a network from such a database, an entity's network, a data center, and/or the like. In some embodiments, and where the system is housed and/or stored within an entity's network, the system may collect the historical data directly and without accessing a network. In some embodiments, the historical data collected may be limited to only the historical data within a predetermined threshold of time (such as within the past five years, four years, three years, two years, one year, six months, and/or the like), such that the data collected and analyzed by the system is limited and the system is not overburdened by data that is no longer applicable for data security purposes. For instance, and where patches may have been created and applied to the system, historical data associated with the intent behind creating such patches may be ignored by the system.

As shown in block 304, the process flow 300 may include the step of determining at least one geographic location identifier for the at least one data transmission. For example, the system may determine at least one geographic location identifier for the user device associated with the at least one data transmission, such as the geographic location identifier where the data transmission was transmitted from/generated and/or the geographic location identifier where the data transmission was received. In such embodiments, the geographic location identifier(s) may be determined based on location identifiers of nearby cellular towers to the user device(s), internet protocol (IP) addresses, nearby networks and Wi-Fi networks, Global Positioning System (GPS) capabilities, and/or the like.

As shown in block 306, the process flow 300 may include the step of generating, by a generative artificial intelligence (AI) engine, a record snapshot of the at least one data transmission and the at least one geographical location identifier, wherein the record snapshot comprises at least one context dataset generated by the generative AI engine. For example, the system may train and use a generative AI engine, which is trained to generate a record snapshot for the at least one data transmission and for the geographic location identifier. As used herein, the record snapshot refers to a writing, script, text, literature, image, alert, composition, story, and/or the like, which comprises information regarding whether the context around the data transmission (such as the likely intent or reasoning behind generating, submitting, and receiving the data transmission) and, in an instance where potential consequences are generated or flagged, the potential consequences if the data transmission was allowed. By way of non-limiting example, the record snapshot may comprise a story or literature showing what the intention behind the data transmission is (e.g., where the user generating and sending the data transmission is a bad actor, the record snapshot may comprise a likely intention for the singular data transmission, or a plurality of data transmissions tracked from the bad actor).

Additionally, and in some embodiments, the system may comprise a generative AI engine which is trained and configured to generate a record snapshot based on the collected historical data. Thus, the generative AI engine may be trained based pre-trained on historical data, geographic location identifiers, and/or the like, to determine whether any potential consequences are likely to occur based on the at least one data transmission and its associated historical data. Thus, and based on this pre-training and based on the current data of the historical data collected and the at least one data transmission, the generative AI engine may generate a vector (e.g., an intention vector) of for the user identifier associated with the data transmission, whereby the vector may indicate the likely intended outcome of the user of the user identifier (such as a malicious or bad intent, an intent to move to a different geographic location such as a final location for a vacation where the user is not a bad actor but just traveling, and/or the like). Further, and based on this vector, the generative AI engine may generate the report snapshot to describe, in detail, the intent of the user associated with the data transmission. Thus, and in some embodiments, the generative AI engine may generate the record snapshot with at least one context dataset, whereby the context dataset refers to the data and/or information that describes, in detail, the intent of the user associated with the data transmission. In some embodiments, the user associated with the data transmission may comprise a sender user (of the data transmission) and/or a recipient user (of the data transmission), and thus, the record snapshot may detail the likely intent and/or movement of the sender user and/or the recipient user in a single context dataset for the overall intent between the sender user and the recipient user and/or in a plurality of context datasets respective to each the sender user and the recipient user.

In some embodiments, the context dataset may be organized based on a priority of intents, whereby the greater the potential consequence of the intent and the outcome of the data transmission, the higher the information and data of the intent will be listed in the context dataset. In some embodiments, context dataset may comprise a plurality of potential intents and potential outcomes, which may be listed based on the likelihood the information and data is correct according to the generative AI engine (e.g., the greater the confidence score of the context data in the context dataset, the higher the context data will be listed in the context dataset). Thus, and in some such embodiments, each context dataset may comprise a plurality of potential intents which for the sender user, the recipient user, and/or the like, based on the collected historical data and data transmission data, whereby the plurality of potential intents are ranked hierarchically (from highest confidence score to lowest confidence score) to indicate the most likely intent to the least likely intent generated by the generative AI engine.

In some embodiments, the generative AI engine may generate the at least one context dataset by contextualizing a significance of a plurality of vectors, wherein the plurality of vectors is based on the historical data. For example, and as described briefly above, the generative AI engine may generate and analyze at least one vector for each piece of data in the collected historical data and/or the current data transmission data. Thus, and by way of non-limiting example, the system may generate a vector showing a likely next step or likely next data transmission request for a user based on the previous data transmissions collected and analyzed by the generative AI engine. For instance, and in some embodiments, the generative AI engine may generate a vector for each data transmission collected (which may be based on the historical data already collected for the user identifier and/or other user identifiers exhibiting the same behaviors in their data transmissions) and each vector generated may comprise a significance indicator (such as a significance value) which may indicate a potential outcome for each data transmissions and its associated data. For example, and where historical data collected for a user indicates that the user has performed maliciously in the past with misappropriating secure data and the methods which the user acted previously to misappropriate the data are occurring again with the current data transmission, then the system may generate the vector with a high significance value as the actions of the user may generate a serious potential consequence. Additionally, and as feedback is received by the generative AI engine (such as from the user themselves, from a manager of the system, from a client of the system, and/or the like), these vectors may be re-calibrated and the significance value may be re-valued to be higher or lower based on the feedback received (e.g., where the generative AI engine was wrong in its vector analysis and significance value, then the vector and the significance value may be increased or decreased accordingly). Further, and based on such feedback, the generative AI engine may be retrained and re-calibrated continuously and as the generative AI engine generates its outputs.

In some embodiments, the record snapshot may comprise a plurality of geographic location identifiers and geographic vectors between geographic location identifiers associated with a user identifier and a plurality of historical resource transmissions. For example, and where a user is traveling toward a vacation destination, and the user stops at a gas station two hours away from the user's residential address, the generative AI engine may analyze the historical data of the user which may indicate that the user has taken a vacation to a specific location every year for the past two years at the same time as the current data transmission and the current data transmission from the location two hours from the user's residential address is halfway between the residential address and the vacation destination. Thus, and in such an example, the generative AI engine may determine that the user's likely next location will be the same vacation destination as the previous years. Such a tracking between locations (e.g., the residential address, the gas station, and the vacation location) may be shown as vectors between each two locations, which may be generated by the generative AI engine in its determination of a potential intent of the user. Further, and upon generating these vectors and analyzing these vectors, the generative AI engine may compare historical vectors to the current vectors and most recent vectors to determine the context data for the record snapshot.

As shown in block 308, the process flow 300 may include the step of generating, by the generative AI engine, a geographic map comprising at least one data point for the historical data and the at least one geographic location identifier. For example, the system—suing the generative AI engine—may generate a geographic map to show each of the vectors between the geographic location identifiers (which may indicate the movement of the user as the user has committed actions such as submitting data transmissions and receiving data transmissions), whereby each instance where an action was taken may be shown as a data point in the geographic map with the historical data at each location and the geographic location identifier. In this manner, an overall picture or graphic of the movements of the user and their individual actions may showcased in a readily understandable environment, such that the broader picture what a potential intent and potential outcomes and consequences are shown.

Thus, and in such embodiments, the generative AI engine may be trained and configured to generate this geographic map with each of these data points for each of the geographic location identifiers (and/or only the data points for recent geographic location identifiers), with the historical data of each geographic location identifier. Additionally, and in some embodiments, the record snapshot may additionally and/or alternatively be shown with the geographic map to indicate potential consequences and an overall intent behind each data point and/or the overall data points. Such embodiments are shown and described below with respect to FIGS. 4-6.

FIG. 4 illustrates a process flow 400 for automatically configuring a user device's graphical user interface with the geographic map, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400. In some embodiments, a generative artificial intelligence engine (e.g., such as the generative AI engine shown in FIG. 2) may perform some or all of the steps described in process flow 400.

In some embodiments, and as shown in block 402, the process flow 400 may include the step of transmitting the geographic map to a user device, wherein the geographic map comprises a configuration trigger for a graphical user interface (GUI). For example, the system may transmit the geographic map generated in FIG. 3 to a user device, such as a user device associated with the user that generated, submitted, and/or received the data transmission, a user associated with a manager of the system, a user associated with a client of the system, and/or the like. Further, and as part of the data of the geographic map, a configuration trigger my additionally be stored in the data of the geographic map, whereby once the geographic map has been transmitted to the user device, the user device may read the configuration trigger and automatically configure its graphical user interface (GUI) to show the details of the geographic map. Thus, and by way of example, the configuration trigger may comprise a script line comprising a command to create and/or update the user interface with the data of the geographic map, whereby the data of the geographic map may comprise widgets which are organized in the same or similar manner to a real world map of the world, and whereby each widget comprises each data point. In some further embodiments, each data point may comprise data and information of the historical data and the at least one geographic location identifier.

In some embodiments, and as shown in process flow 400, the process described with respect to process flow 400 may occur after the process described above with respect to block 308.

In some embodiments, and as shown in block 404, the process flow 400 may include the step of automatically configuring, at a user device, the GUI of the user device with the geographic map. For example, and in some such embodiments, once the geographic map has been transmitted to the user device and the user device has read at least the configuration trigger of the geographic map file, then the user device may automatically configure its GUI to show the data of the geographic map in a human-readable manner (e.g., by generating and showing the widgets). Additionally, and in some embodiments, the geographic map may be interactive on the GUI of the user device, such that as a user interacts with and generates user inputs at the user device (e.g., clicking on the data points within the geographic map, clicking on alerts in the geographic map, and/or the like), the geographic map may dynamically update to show greater details and information of the selected data point in the geographic map. For instance, and when a user selects or clicks on the geolocation in the geographic map associated with the current data transmission, the GUI may dynamically update to show the data of the data transmission (e.g., a resource transfer amount, a timestamp, a user identifier, and/or the like), the geographic location identifier, and/or the like, and the GUI may additionally show the likely intent of the data transmission and its potential consequence.

FIG. 5 illustrates a process flow 500 for automatically configuring a user device's graphical user interface with the record snapshot, in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500. In some embodiments, a generative artificial intelligence engine (e.g., such as the generative AI engine shown in FIG. 2) may perform some or all of the steps described in process flow 500.

In some embodiments, and as shown in block 502, the process flow 500 may include the step of transmitting the record snapshot to a user device, wherein the record snapshot comprises a configuration trigger for a graphical user interface (GUI). For instance, and in some such embodiments, the system may, in addition to and/or alternatively to FIG. 4's geographic map, transmit the record snapshot to a user device (e.g., such as a user device associated with the user that generated, submitted, and/or received the data transmission, a user associated with a manager of the system, a user associated with a client of the system, and/or the like), whereby the record snapshot may also comprise its own, similar configuration trigger to the configuration trigger of the geographic map. Thus, and as described above, the configuration trigger of the snapshot record may be generated and perform in the same manner as the configuration trigger for the geographic map.

In some embodiments, and as shown in process flow 500, the process described with respect to process flow 500 may occur after the process described above with respect to block 308.

In some embodiments, and as shown in block 504, the process flow 500 may include the step of automatically configuring, at a user device, the GUI of the user device with the record snapshot. Similar to the configuration of the GUI with the geographic map in FIG. 4, the record snapshot and its associated information and data may be shown and configured in the user device's GUI in a human-readable format. Thus, and as a user interacts with the record snapshot, the GUI may show the likely intent behind the historical data and the current data transmission, and potential consequential outcomes of the historical data and the current data transmission.

FIG. 6 illustrates a process flow 600 for automatically configuring a user device's graphical user interface with the record snapshot and the geographic map, in accordance with an embodiment of the disclosure. In some embodiments, a system (e.g., similar to one or more of the systems described herein with respect to FIGS. 1A-1C) may perform one or more of the steps of process flow 600. For example, a system (e.g., the system 130 described herein with respect to FIG. 1A-1C) may perform the steps of process 600. In some embodiments, a generative artificial intelligence engine (e.g., such as the generative AI engine shown in FIG. 2) may perform some or all of the steps described in process flow 600.

In some embodiments, and as shown in block 602, the process flow 600 may include the step of transmitting the record snapshot and the geographic map to a user device. For instance, and in some embodiments, the system may transmit the record snapshot and the geographic map to the user device at the same time or in near real time to each other, such that the user device may configure its GUI to show the record snapshot and the geographic map together at the same time in separate windows, widgets, or in the same window or widget. In some embodiments, a configuration trigger for both the geographic map and the record snapshot may be stored in the data of the geographic map and the record snapshot, such that the user device may automatically trigger the configuration of the user device's GUI once the user device has read the script line for the configuration trigger. In some embodiments, and depending on the settings of the user device with respect to its GUI, the widget showing the record snapshot may only be shown on the user device's GUI when the geographic map is interacted with and the associated record snapshot for a data point is selected (e.g., when the data point for a geographic location identifier is selected, then a pop up of the record snapshot may be overlayed on the geographic map). In some embodiments, the widgets showing the record snapshot and the geographic map may be split down the middle of the GUI, and as the user interacts with the record snapshot, the geographic map may dynamically update to an associated data point (e.g., as a user selects or expands a description for a past or previous data transmission of the historical data used to generate the description in the record snapshot, then the associated data point for that previous data transmission may be automatically shown and zoomed in on in the geographic map). Similarly, and as a user interacts with the geographic map, the associated record snapshot may update to show the data and information associated with that particular data point.

In some embodiments, and as shown in process flow 600, the process described with respect to process flow 600 may occur after the process described above with respect to block 308.

In some embodiments, and as shown in block 604, the process flow 600 may include the step of automatically configuring, at a user device, a graphical user interface (GUI) of the user device with the geographic map and the record snapshot, wherein the record snapshot updates as the user device receives an input for the geographic map. For example, the user device may configure its GUI to show the geographic map and the record snapshot at the same, one at a time, and/or the like. In some embodiments, the interaction of the geographic map may dynamically update the view of the record snapshot, and vice versa. In some other embodiments, the interaction on the geographic map may not dynamically update or cause any update to the view of the record snapshot, and vice versa. Therefore, and in such an embodiment, the widgets of the record snapshot and the geographic map may be separately interaction of one widger will not affect the view of the other widget.

FIG. 7 illustrates a process flow 700 for generating an alert interface component and triggering a configuration of a user device's graphical user interface with the alert interface component, in accordance with an embodiment of the disclosure. In some embodiments, a system (e.g., similar to one or more of the systems described herein with respect to FIGS. 1A-1C) may perform one or more of the steps of process flow 700. For example, a system (e.g., the system 130 described herein with respect to FIG. 1A-1C) may perform the steps of process 700. In some embodiments, a generative artificial intelligence engine (e.g., such as the generative AI engine shown in FIG. 2) may perform some or all of the steps described in process flow 700.

In some embodiments, and as shown in block 702, the process flow 700 may include the step of identifying a user input from a user device. For example, and in some embodiments, the system may identify a user input from the user device, such as a user input associated with generating a resource transmission request/data transmission request, submitting the resource transmission request/data transmission request, and/or receiving a resource transmission/data transmission. Further, and upon identifying the user input and its associated data (such as geographic location identifier, timestamps, user account identifier, and/or the like), the system may collect this data and apply the user input and its data to the generative AI engine for analysis and generation of a potential consequence for allowing the resource transmission to occur and/or future resource transmissions to occur from or to the user.

In some embodiments, and as shown in block 704, the process flow 700 may include the step of determining, by the generative AI engine, at least one potential consequence of the user input in real time, wherein the potential consequence is generated based on a dataset of consequential historical data associated with a plurality of user identifiers. For instance, and in such embodiments, the system—using the generative AI engine—may analyze the historical data and the user input (such as the current data transmission data, the geographic location identifier, the amount of the resource transmission where applicable, the recipient user/sending user, and/or the like), to determine at least one potential consequence of the user input in real time. For example, the at least one potential consequence may comprise a bad or misappropriating potential consequence (such as the misappropriation of a resource, secure data, and/or the like), a normal potential consequence (e.g., the data transmission/user input will not likely cause any issues or malfeasant activity), and/or the like. Further, and in order to make this determination, the generative AI engine may analyze the user input and its data against consequential historical data, whereby the consequential historical data may comprise user inputs from other users, from other geographic location identifiers, from the same user, from the same geographic location identifiers, and/or the like, which caused an issue or malfeasant activity to occur. In some embodiments, the generative AI engine may additionally be trained on non-consequential historical data, whereby the non-consequential historical data may comprise user inputs from other users, from other geographic location identifiers, from the same user, from the same geographic location identifiers, and/or the like, which did not cause an issue or malfeasant activity to occur. Thus, and based on this trained generative AI engine, the generative AI engine may determine a potential consequence for the user input, and whether that potential consequence is likely to be an issue or a non-issue.

In some embodiments, and as shown in block 706, the process flow 700 may include the step of generating an alert interface component comprising the at least one potential consequence. For instance, and in some embodiments, the system may generate an alert interface component comprising the data of the potential consequence determined in block 704, whereby the data and information of the potential consequence may be backed into a data packet of the alert interface component and used to configure a GUI of a user device to show the information of the potential consequence in a human-readable format. In some embodiments, and where a plurality of potential consequences are determined and ranked based on most likely to least likely to occur and/or ranked based on most serious to least serious, then the alert interface component may comprise the information for the plurality of potential consequences ranked in the same manner for configuring on the GUI.

In some embodiments, and as shown in block 708, the process flow 700 may include the step of transmitting the alert interface component to the user device. For example, and in some embodiments, the system may transmit the alert interface component to the user device, whereby the alert interface component may—in some embodiments—comprise its own configuration trigger similar to that described above with respect to FIGS. 4-6, which may be used to automatically configure the GUI of the user device to show the information of the alert interface component once the user device receives and reads the configuration trigger script line.

In some embodiments, the user device that receives the alert interface component may comprise the user device associated with the user input, a user device associated with a manager of the system, a user device associated with a client of the system, and/or the like. By way of non-limiting example, and where a user input comprises a password input as part of an authentication credential setup, and where the password may be determined as weak (and, thus, likely to be guessed by a malfeasant actor) by the generative AI engine, then the alert interface component may comprise an alert to the user inputting the password—in real time—to pick a new password and the potential consequences if the user does not pick a new password (e.g., the account may be hacked).

In some embodiments, and as shown in block 710, the process flow 700 may include the step of triggering a configuration of a graphical user interface (GUI) of the user device based on the alert interface component. For example, the system may trigger (automatically) the configuration of the user device based on the user device receiving the alert interface component. Such a configuration may occur in real time or in near real time to transmitting the alert interface component and the user device receiving the alert interface component.

FIG. 8 illustrates a process flow 800 for training the generative AI engine, in accordance with an embodiment of the disclosure. In some embodiments, a system (e.g., similar to one or more of the systems described herein with respect to FIGS. 1A-1C) may perform one or more of the steps of process flow 800. For example, a system (e.g., the system 130 described herein with respect to FIG. 1A-1C) may perform the steps of process 800. In some embodiments, a generative artificial intelligence engine (e.g., such as the generative AI engine shown in FIG. 2) may perform some or all of the steps described in process flow 800.

In some embodiments, and as shown in block 802, the process flow 800 may include the step of collecting a geographic historical dataset comprising a plurality of historical geographic identifiers associated with a plurality of historical resource transmissions. For instance, the system may collect a geographic historical dataset comprising a plurality of historical resource transmissions and/or historical data transmission and their geographic location identifiers. Thus, and based on this collection of geographic historical data, the system may generate a first training dataset.

In some embodiments, and as shown in block 804, the process flow 800 may include the step of generating a first training dataset comprising the geographic historical dataset. Thus, and in some such embodiments, the first training dataset may be generated based on the collection of at least one geographic historical dataset(s), which may be collected and generated at a first time, and/or at intermittent and continuous periods, such that the training datasets are continuously generated and applied to the generative AI engine.

In some embodiments, and as shown in block 806, the process flow 800 may include the step of applying the first training dataset to the generative AI engine. For example, and in some such embodiments, the system may train the generative AI engine at a first instance, by applying the first training dataset to the generative AI engine. Thus, and as the generative AI engine analyzes the geographic historical dataset(s), the generative AI engine may determine patterns for particular geographic location identifiers, such as times where/when data transmission requests are submitted and/or where/when data transmissions are received, normally. Further, and based on this training, the generative AI engine may also determine what may may be abnormal geographic location identifiers and times for these geographic location identifiers for data transmissions requests and data transmissions.

In some embodiments, and as shown in block 808, the process flow 800 may include the step of collecting a plurality of historical user inputs, wherein the plurality of historical user inputs comprises a plurality of consequential historical user inputs. For instance, and in some embodiments, the system may additionally collect a plurality of historical user inputs, whereby the plurality of historical user inputs comprises a plurality of consequential historical user inputs (such as consequential historical user inputs that have caused issues and/or have not caused any issues). Thus, and in some embodiments, the historical user inputs may be collected to show the historical user inputs and their consequences which have been tracked from the historical user inputs submitted. In some embodiments, the consequential historical user inputs may comprise only historical user inputs that caused serious problems or issues. Additionally, and/or alternatively, the historical user inputs may comprise only historical user inputs that did not cause any issues (e.g., did not cause any abnormal or unexpected issues such as misappropriation of resources or secure data). In some embodiments, the plurality of historical user inputs may be collected based on the previously collected geographic historical dataset(s), such that the historical user inputs collected are the historical user inputs associated with and generated or received at the historical geographic identifiers of the geographic historical dataset. In some embodiments, the historical user inputs collected may not be affiliated with the historical geographic identifiers at all, and instead may have only been collected based on their historical consequences. In this manner, the generative AI engine may be trained on a higher scale and with more data than just historical user inputs associated with particular historical geographic identifiers.

In some embodiments, and as shown in block 810, the process flow 800 may include the step of generating a second training dataset comprising the plurality of historical user inputs. For instance, the system may generate a secondary training dataset comprising the plurality of historical user inputs as at least one data packet, which may then be applied to the generative AI engine for training. Additionally, and similar to block 804, the plurality of historical user inputs may be collected and generated at a first time, and/or at intermittent and continuous periods, such that the training datasets are continuously generated and applied to the generative AI engine.

In some embodiments, and as shown in block 812, the process flow 800 may include the step of applying the second training dataset to the generative AI engine. For example, the system may apply the second training dataset to the generative AI engine, such that generative AI engine may be trained to determine potential consequences for user inputs at a future instance. Thus, as described above, the determined potential consequences may comprise issues or non-issues, and the generative AI engine may be trained to make these determinations based on these historical user inputs. Further, and based on the training of the generative AI engine with the geographic historical dataset(s), the generative AI engine may make more refined and correct decisions on potential consequences based on both the user inputs themselves (e.g., the data transmission requests and the data transmissions, themselves) and based on the geographic location identifiers. For instance, and where a geographic location identifier has been associated with malfeasant activity previously and where the current user input at the geographic location is similar to previous instances of malfeasant or issue activity, the generative AI engine may make an accurate determination that a potential consequence will be the same malfeasant activity that has historically been shown. Further, and by analyzing both sets of training datasets in its training, the generative AI engine may generate its own nodes and vectors between each of these datapoints and generate an overall picture or story (e.g., the context data in the record snapshot) of what each datapoint and their associated data mean for the overall story and intent behind the data transmissions/user inputs. Additionally, and as understood by a person of skill in the art, the process described herein with respect to FIG. 8 is not limited to the ordered combination shown, but rather blocks 808-812 and their associated steps may occur before blocks 802-806 and their associated steps.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamically generating data security models and visualizations of data security vulnerabilities using generative artificial intelligence, the system comprising:

a memory device with computer-readable program code stored thereon;

at least one processing device operatively coupled to the at least one memory device and the at least one communication device, wherein executing the computer-readable code is configured to cause the at least one processing device to:

collect historical data associated with at least one data transmission;

determine at least one geographic location identifier for the at least one data transmission;

determine a user identifier for the at least one data transmission;

generate, by a generative artificial intelligence (AI) engine, a record snapshot of the at least one data transmission and the at least one geographic location identifier, wherein the record snapshot comprises at least one context dataset indicating an intent of a user associated with the user identifier in reference to the at least one data transmission;

generate, by the generative AI engine, a geographic map comprising at least one data point for the historical data and the at least one geographic location identifier;

identify a user input from a user device;

determine, by the generative AI engine, at least one potential consequence of the user input in real time, wherein the potential consequence is generated based on a dataset of consequential historical data associated with a plurality of user identifiers;

generate an alert interface component comprising the at least one potential consequence;

transmit the alert interface component to the user device; and trigger a configuration of a graphical user interface (GUI) of the user device.

2. The system of claim 1, wherein executing the computer-readable code is further configured to cause the at least one processing device to:

transmit the geographic map to a user device, wherein the geographic map comprises a configuration trigger for a graphical user interface (GUI); and automatically configure, at a user device, the GUI of the user device with the geographic map.

3. The system of claim 2, wherein the geographic map is interactive on the GUI of the user device.

4. The system of claim 1, wherein executing the computer-readable code is further configured to cause the at least one processing device to:

transmit the record snapshot to a user device, wherein the record snapshot comprises a configuration trigger for a graphical user interface (GUI); and automatically configure, at a user device, the GUI of the user device with the record snapshot.

5. The system of claim 1, wherein executing the computer-readable code is further configured to cause the at least one processing device to:

transmit the record snapshot and the geographic map to a user device; and automatically configure, at the user device, a configuration of a graphical user interface (GUI) of the user device with the geographic map and the record snapshot, wherein the record snapshot updates as the user device receives an input for the geographic map.

6. The system of claim 1, wherein the generative AI engine generates the at least one context dataset by contextualizing a significance of a plurality of vectors, wherein the plurality of vectors is based on the historical data.

7. The system of claim 1, wherein the record snapshot comprises a plurality of geographic location identifiers and geographic vectors between geographic location identifiers associated with a user identifier and a plurality of historical resource transmissions.

8. The system of claim 1, wherein the at least one data point indicates one or more potential data security vulnerabilities.

9. The system of claim 1, wherein executing the computer-readable code is further configured to cause the at least one processing device to:

collect a geographic historical dataset comprising a plurality of historical geographic identifiers associated with a plurality of historical resource transmission;

generate a first training dataset comprising the geographic historical dataset;

apply the first training dataset to the generative AI engine;

collect a plurality of historical user inputs, wherein the plurality of historical user inputs comprises a plurality of consequential historical user inputs;

generate a second training dataset comprising the plurality of historical user inputs; and apply the second training dataset to the generative AI engine.

10. A computer program product for dynamically generating data security models and visualizations of data security vulnerabilities using generative artificial intelligence, the computer program product comprising a non-transitory computer-readable medium comprising code causing an apparatus to:

collect historical data associated with at least one data transmission;

determine at least one geographic location identifier for the at least one data transmission;

determine a user identifier for the at least one data transmission;

generate, by a generative artificial intelligence (AI) engine, a record snapshot of the at least one data transmission and the at least one geographic location identifier, wherein the record snapshot comprises at least one context dataset indicating an intent of a user associated with the user identifier in reference to the at least one data transmission;

generate, by the generative AI engine, a geographic map comprising at least one data point for the historical data and the at least one geographic location identifier;

identify a user input from a user device;

determine, by the generative AI engine, at least one potential consequence of the user input in real time, wherein the potential consequence is generated based on a dataset of consequential historical data associated with a plurality of user identifiers;

generate an alert interface component comprising the at least one potential consequence;

transmit the alert interface component to the user device; and trigger a configuration of a graphical user interface (GUI) of the user device.

11. The computer program product of claim 10, the computer program product further comprising non-transitory computer-readable medium comprising code causing an apparatus to:

transmit the geographic map to a user device, wherein the geographic map comprises a configuration trigger for a graphical user interface (GUI); and automatically configure, at a user device, the GUI of the user device with the geographic map.

12. The computer program product of claim 11, wherein the geographic map is interactive on the GUI of the user device.

13. The computer program product of claim 10, the computer program product further comprising non-transitory computer-readable medium comprising code causing an apparatus to:

transmit the record snapshot to a user device, wherein the record snapshot comprises a configuration trigger for a graphical user interface (GUI); and automatically configure, at a user device, the GUI of the user device with the record snapshot.

14. The computer program product of claim 10, wherein the generative AI engine generates the at least one context dataset by contextualizing a significance of a plurality of vectors, wherein the plurality of vectors is based on the historical data.

15. The computer program product of claim 10, wherein the record snapshot comprises a plurality of geographic location identifiers and geographic vectors between geographic location identifiers associated with a user identifier and a plurality of historical resource transmissions.

16. A computer implemented method for dynamically generating data security models and visualizations of data security vulnerabilities using generative artificial intelligence, the computer implemented method comprising:

collecting historical data associated with at least one data transmission;

determining at least one geographic location identifier for the at least one data transmission;

determining a user identifier for the at least one data transmission;

generating, by a generative artificial intelligence (AI) engine, a record snapshot of the at least one data transmission and the at least one geographic location identifier, wherein the record snapshot comprises at least one context dataset indicating an intent of a user associated with the user identifier in reference to the at least one data transmission;

generating, by the generative AI engine, a geographic map comprising at least one data point for the historical data and the at least one geographic location identifier;

identify a user input from a user device;

determine, by the generative AI engine, at least one potential consequence of the user input in real time, wherein the potential consequence is generated based on a dataset of consequential historical data associated with a plurality of user identifiers;

generate an alert interface component comprising the at least one potential consequence;

transmit the alert interface component to the user device; and trigger a configuration of a graphical user interface (GUI) of the user device.

17. The computer implemented method of claim 16, further comprising:

transmitting the geographic map to a user device, wherein the geographic map comprises a configuration trigger for a graphical user interface (GUI); and automatically configuring, at a user device, the GUI of the user device with the geographic map.

18. The computer implemented method of claim 17, wherein the geographic map is interactive on the GUI of the user device.

19. The computer implemented method of claim 16, further comprising:

transmit the record snapshot to a user device, wherein the record snapshot comprises a configuration trigger for a graphical user interface (GUI); and automatically configure, at a user device, the GUI of the user device with the record snapshot.

20. The computer implemented method of claim 16, wherein the generative AI engine generates the at least one context dataset by contextualizing a significance of a plurality of vectors, wherein the plurality of vectors is based on the historical data.

* * * * *